United States Patent
Schrewe

(10) Patent No.: US 8,783,423 B2
(45) Date of Patent: Jul. 22, 2014

(54) MULTI-PART MULTI-STAGE BRAKES

(75) Inventor: Mark Schrewe, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 696 days.

(21) Appl. No.: 11/962,673

(22) Filed: Dec. 21, 2007

(65) Prior Publication Data

US 2009/0159378 A1  Jun. 25, 2009

(51) Int. Cl.
*F16D 55/228* (2006.01)

(52) U.S. Cl.
USPC .......................... 188/72.5; 188/83

(58) Field of Classification Search
USPC .......... 188/71.3, 71.4, 72.5, 72.6, 73.1, 73.2, 188/105, 106 P, 346, 347, 83, 84; 74/97.1; 251/75
See application file for complete search history.

(56) References Cited

U.S. PATENT DOCUMENTS

| | | | |
|---|---|---|---|
| 1,922,928 A * | 8/1933 | Cave, Jr. ................ | 137/505.26 |
| 3,453,029 A * | 7/1969 | Swanson ................ | 303/9.73 |
| 3,473,631 A * | 10/1969 | Schmid ................ | 188/71.6 |
| 3,487,894 A * | 1/1970 | Szigeti ................ | 188/70 R |
| 3,602,328 A | 8/1971 | Fannin et al. | |
| 3,767,015 A * | 10/1973 | Odier ................ | 188/71.6 |
| 3,882,972 A * | 5/1975 | Newstead et al. ...... | 188/72.5 |
| 4,014,409 A | 3/1977 | Haydu et al. | |
| 4,207,968 A * | 6/1980 | Chamberlain ......... | 188/71.4 |
| 4,315,563 A * | 2/1982 | Hayashi et al. ........ | 188/73.1 |
| 4,700,816 A | 10/1987 | Rath | |
| 5,103,939 A | 4/1992 | Schroeter | |
| 5,168,963 A * | 12/1992 | Poncini ................ | 188/72.5 |
| 5,291,973 A * | 3/1994 | Chareire ............... | 188/71.5 |
| 5,477,944 A | 12/1995 | Bryan et al. | |
| 5,620,063 A * | 4/1997 | Smith ................ | 188/73.2 |
| 6,155,390 A | 12/2000 | Ozechowski | |
| 6,308,807 B1* | 10/2001 | Matsumoto et al. ..... | 188/72.4 |
| 6,651,785 B2 | 11/2003 | Cornolti et al. | |
| 7,178,640 B2 | 2/2007 | Nowak et al. | |
| 7,182,182 B2 | 2/2007 | Dupuis | |
| 7,425,043 B2* | 9/2008 | Doerr et al. ............ | 303/193 |

FOREIGN PATENT DOCUMENTS

JP        06074261 A   *  3/1994   ............ F16D 55/224
JP     2007296982 A   * 11/2007

OTHER PUBLICATIONS

English-language Machine Translation of JP 06-074261.*
English-language Abstract of JP 2007-296982.*

* cited by examiner

*Primary Examiner* — Bradley King
*Assistant Examiner* — Nicholas J Lane
(74) *Attorney, Agent, or Firm* — Mark E. Duell; Rankin, Hill & Clark LLP

(57) ABSTRACT

A disc brake having a rotor and a caliper is provided and includes a first and second brake pad situated on the same side of the rotor whereby in a non-braking state the first brake pad is in contact with the rotor and the second brake pad is offset from the rotor. In a light braking state the first pad acts against the rotor with additional force to thereby slow or stop the vehicle. In a heavier braking state both the first and second brake pads act against the rotor to thereby slow or stop the vehicle.

16 Claims, 3 Drawing Sheets

MULTI-PART MULTI-STAGE BRAKES

BACKGROUND OF THE INVENTION

1. Field of the Invention

The present invention relates to disc brakes for an automotive vehicle. More specifically, the present invention relates to disc brakes having multiple brake pads that operate independently from each other to ultimately decrease the amount of brake drag associated with disc brakes.

2. Description of Related Art

In conventional disc brakes the brake pad is a single piece design that is actuated by one or more pistons per caliper in a hydraulic system. In order to optimize the braking (or stopping) performance of the disc brake, the brake pad must always be in constant contact with the disc (or rotor), even when the brake is not applied. Thus, in order to activate the brake brakes and stop the vehicle the drive need apply only a small amount of force to the brake pedal. Because the brake pad is in constant contact with the disc, however, a force called brake drag acts to impede the motion of the vehicle when the brake is not applied. Brake drag, therefore, has a negative effect on fuel economy.

One solution to the above disadvantage is to reduce the force of the brake pad against the disc or offset the brake pad from the disc altogether. Thus, the brake drag could be reduced or even eliminated thereby increasing the fuel economy of the vehicle. A disadvantage to this solution, however, is that the brakes would become less responsive because it would take a greater force by the driver to apply the brakes thereby compromising the braking performance of the brakes.

Thus, what is required is a disc brake that reduces the brake drag thereby increasing the fuel economy of the vehicle without compromising the braking performance of the brakes.

SUMMARY OF THE INVENTION

In accordance with one aspect, the present invention overcomes the above mentioned disadvantages by providing a brake system for a disc brake having a rotor and a caliper for an automotive vehicle comprising a plurality of brake pads situated on a side of the rotor, a plurality of pistons to actuate the plurality of brake pads, a sealing mechanism situated in a hydraulic sealing chamber where in a non-applied braking state at least one brake pad from the plurality of brake pads is in contact with the rotor and at least one different brake pad from the plurality of brake pads is offset from the rotor.

In accordance with another aspect, the present invention further includes a plurality of piston chambers and a plurality of piston brake lines operatively connecting the hydraulic sealing chamber to the plurality of piston chambers where the plurality of pistons reside inside the piston chambers and the sealing mechanism operates to regulate the flow of hydraulic fluid into the plurality of piston brake lines.

Additional benefits and advantages of the present invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings that form a part of the specification.

DETAILED DESCRIPTION OF THE INVENTION

Brake drag is a function of several factors including the contact surface area between the brake pad and the disc. Thus, reducing the contact surface area between the brake pad and the disc will in turn increase fuel economy. The present invention incorporates a multi-pad braking system 10 having multiple brake pads whereby each brake pad operates independently from each other. The multi-pad braking system 10 allows at least one pad to remain in constant contact with the disc to maintain optimum braking performance while the other pad(s) are either offset from the surface of the disc or in contact with the disc with less force than the at least one pad. Thus, the overall contact surface area between the brake pad and the disc is reduced, which in turn proportionally reduces the brake drag. The overall surface area of the multiple brake pads, however, remains unchanged from the overall surface area of the single piece conventional brake pad. Further, because the at least one pad remains in constant contact with the disc with the same force as in the conventional design the brake quickly responds thereby stopping the vehicle when the driver applies the brake. Thus, braking responsiveness and performance are not compromised.

Further, the multi-pad braking system 10 performs as a multi-stage braking system. For example, if light braking is required a small amount of pedal force by the driver activates the at least one brake pad to thereby slow or stop the vehicle. If stronger braking is required additional pedal force by the driver will activate the remaining brake pad(s) and, thus, both sets of brake pads act to slow or stop the vehicle, as will be described in more detail further below.

Figure 1:
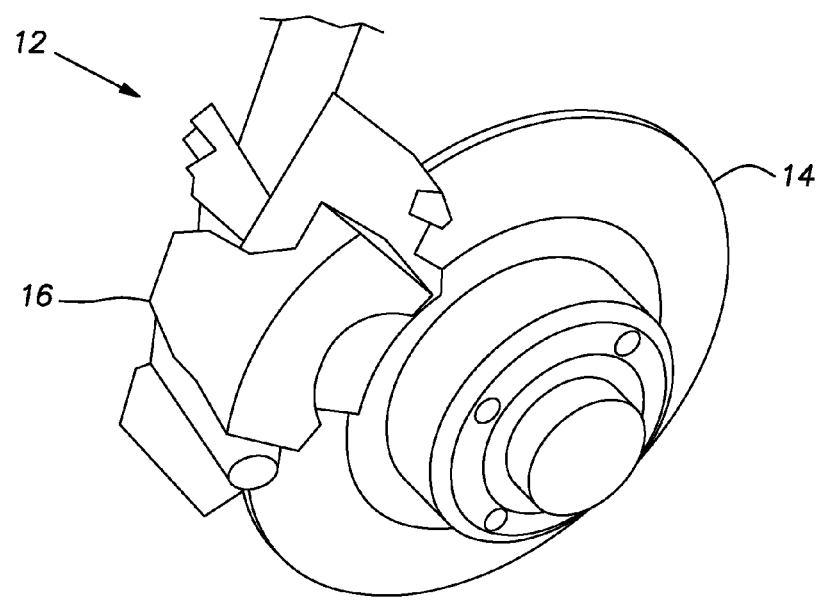
FIG. 1 is a perspective view of a typical disc brake employing a brake system in accordance with the present invention.
Figure 2:
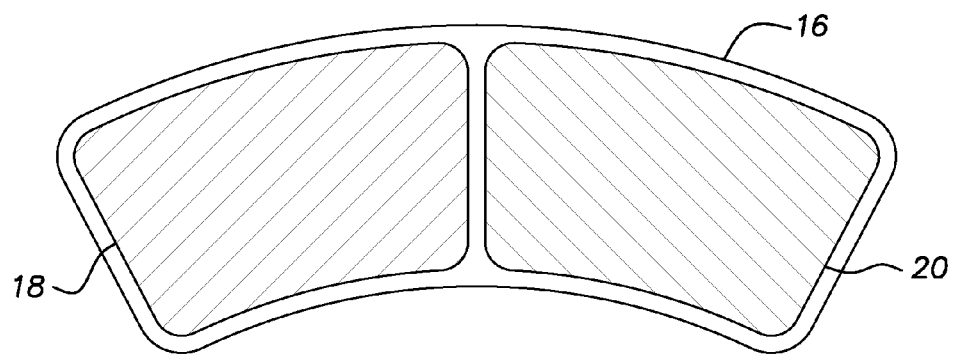
FIG. 2 is view of a caliper showing the arrangement of multiple disc brake pads.

Referring now to the drawings, FIG. 1 shows a typical disc brake 12 incorporating the multi-pad braking system 10 in accordance with the present invention. The disc brake 12 includes a disc or rotor 14 and a caliper 16. It should be noted that the rotor 14 is of the type commonly known in the art and will not be discussed hereinafter. It should be further noted that the caliper 16 is of the type commonly known in the art, such as, a floating or fixed caliper and will not be discussed hereinafter. FIG. 2 shows the arrangement of multiple brake pads 18, 20 on one side of the caliper 14. Thus, the embodiment shown in FIG. 2 includes four brake pads. It should be noted, however, that the number of brake pads may vary depending on the application. For example, more than four (two per side) brake pads may be desirable for high performance vehicles such as racing cars or motorcycles. Thus, the embodiment disclosed in the description and the figures is for illustrative purposes only and is not intended to limit the scope of the invention. It should be further noted that the total surface area of the multiple brakes is approximately equal to the surface area of a single brake pad in the conventional disc brakes explained above.

Figure 3:
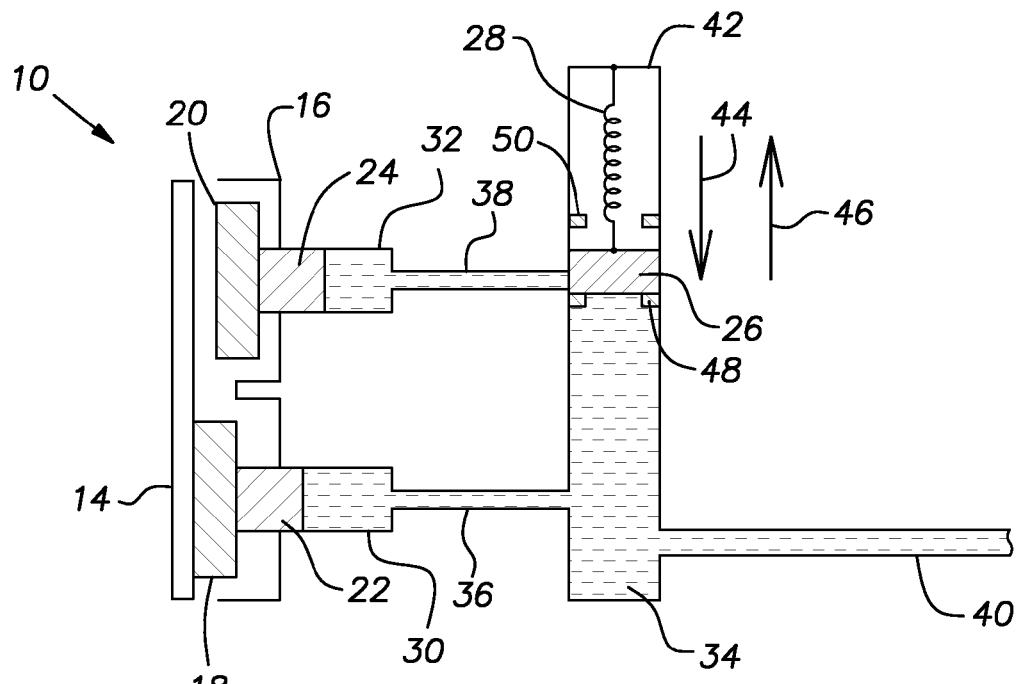
FIG. 3 is a schematic view of the inventive brake system in a non-applied or light-braking state.
Figure 4:
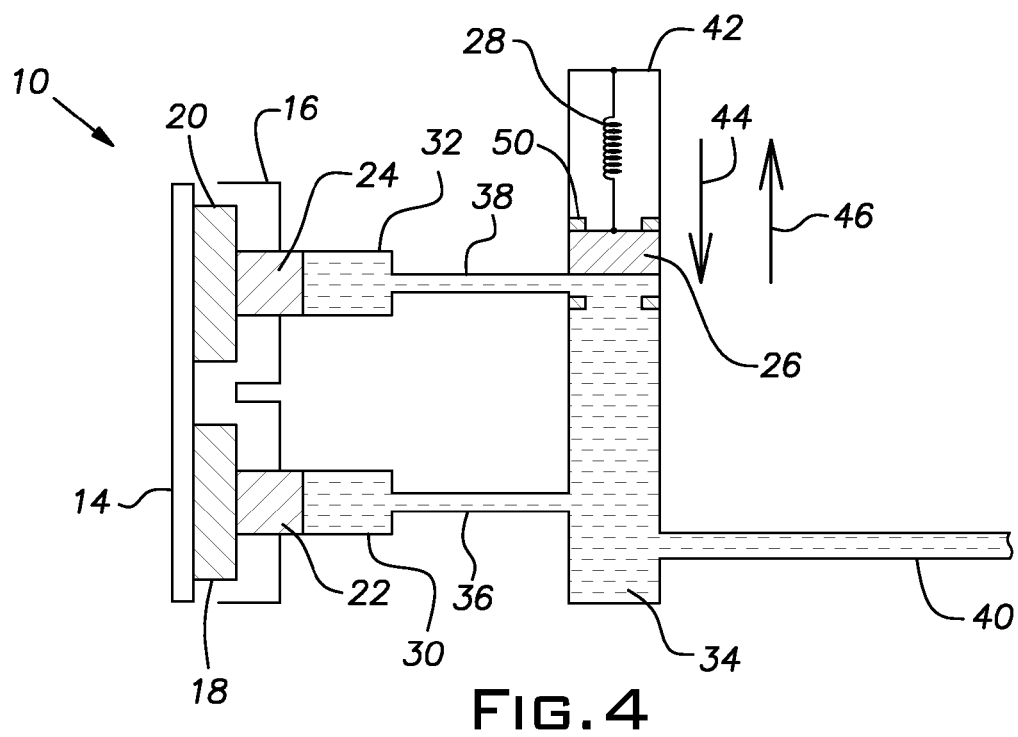
FIG. 4 is a schematic view of the inventive brake system in a heavier-braking state.

Referring to FIGS. 3 and 4, the braking system 10 in accordance with the present invention is schematically illustrated. For purposes of simplicity, operation of the braking system 10 will be described with reference to brake pads on the inside part of the caliper 16. The brake pads on the outside part of the caliper operate in accordance with a typical floating or fixed caliper and, thus will not be described further. The braking system 10 includes a first brake pad 18, a second brake pad 20, a first brake pad piston 22, a second brake pad piston 24 and a sealing mechanism. In the embodiment shown in FIGS. 3 and 4, the sealing mechanism comprises a sealing piston 26 and a sealing piston spring 28. The first brake pad piston 22 and the second brake pad piston 24 are housed in a first piston chamber 30 and a second piston chamber 32 respectively and are actuated by hydraulic fluid 34 via a first piston brake line 36 and a second piston brake line 38. The hydraulic fluid 34 is supplied by the vehicle's brake system in a conventional manner via a main brake line 40.

Still referring to FIGS. 3 and 4, the sealing piston 26 and sealing piston spring 28, which biases the sealing piston 26 in a direction indicated by the first arrow 44, are housed in a sealing chamber 42. The sealing chamber 42 is connected to the first piston brake line 36, the second piston brake line 38 and the main brake line 40. Thus, the main brake line 40 supplies hydraulic fluid 34 to the sealing chamber 42, which in turn supplies hydraulic fluid 34 to the first 36 and second 38 piston brake lines. It should be noted that under all non-braking and braking states (or conditions) the sealing chamber 42 is fluidly connected to both the main brake line 40 and to the first piston brake line 36, but not to the second piston brake line 38. Only when the braking system 10 is in a heavy braking state, described below, is the sealing chamber 42 fluidly connected to the second piston brake line 38. "Fluidly connected" is herein defined where the hydraulic fluid 34 is not prevented from flowing between a brake line and the sealing chamber 42. Thus, depending on the state of the brakes, the sealing piston 26 moves (or doesn't move) within the sealing chamber 42 to regulate the flow of hydraulic fluid 34 into the first 36 and second 38 piston brake lines. The movement of the sealing piston 26 within the sealing chamber 42 is limited by a first stopper ring 48 and a second stopper ring 50, as will be explained further below.

Referring to FIG. 3, FIG. 3 shows the braking system 10 in a non-braking or light-braking state. In the non-braking state the first brake pad 18 is in contact with a surface of the rotor 14 whereas the second brake pad 20 is offset from the rotor 14. Thus, while the vehicle is in motion the total surface area of the brake pad contacting the surface of the rotor 14 is reduced by half, which in turn proportionally reduces the brake drag as explained above. In the non-braking state the sealing piston spring 28 biases the sealing piston 26 in the direction indicated by the arrow 44 until the sealing piston contacts the first stopper ring 48. Thus, the sealing piston 26 seals off the second piston brake line 38 to prevent any additional hydraulic fluid 34 from entering the second piston brake line 38. In other words, the sealing chamber 42 and the second piston brake line 38 are not fluidly connected. Accordingly, in the non-braking state the hydraulic fluid 34 flows from the main brake line 40 into the sealing chamber 42 and then through the first piston brake line 36 into the first piston chamber 30. The hydraulic fluid 34, thus, forces the first brake pad piston 22 against the first brake pad 18 thereby forcing the first brake pad 18 against the rotor 14, as shown in FIG. 3. Therefore, the first brake pad 18 is in contact with the rotor 14 to provide the braking responsiveness described above.

Still referring to FIG. 3, the light braking state is a state where the driver lightly applies pressure to the brake pedal to slow or stop the vehicle. In this state, as in the non-braking state, the first brake pad 18 is in contact with the surface of the rotor 14 whereas the second brake pad 20 remains offset from the rotor 14. In the light-braking state, however, additional hydraulic fluid 34 is pumped through the main brake line 40 and into the sealing chamber 42, which in turn applies additional pressure against the sealing piston 26 in a direction indicated by the second arrow 46. The sealing piston spring 28, however, biases the sealing piston 26 in the direction indicated by the first arrow 44, thereby preventing the sealing piston 26 from moving. In other words, the opposing force of the sealing piston spring 28 is greater than the force of the additional pressure of the hydraulic fluid 34. Thus, the opposing force provided by the sealing piston spring 28 forces additional hydraulic fluid into the first piston brake line 36, which forces the first brake pad 18 against the rotor 14 with a greater force to thereby slow or stop the vehicle. Therefore, under light-braking conditions only actuation of the first brake pad 18 is required to slow or stop the vehicle.

Referring to FIG. 4, FIG. 4 shows the braking system 10 in a state where stronger braking is required. In the stronger braking state additional braking force is required to slow or stop the vehicle. Thus, the driver must apply a stronger pressure to the brake pedal. In this state both the first brake pad 18 and the second brake pad 20 are in contact with the rotor 14 so as to slow or stop the vehicle. When the driver applies a stronger force to the brake pedal additional hydraulic fluid 34 is pumped through the main brake line 40 and into the sealing chamber 42. This in turn forces the sealing piston 26 in the direction indicated by the second arrow 46 such that the sealing piston 26 moves until it contacts the second stopper ring 50. This allows the hydraulic fluid to flow into the second piston brake line 38, which in turn forces the second brake pad 20 against the rotor 14, as shown in FIG. 4. Thus, both the first brake pad 18 and the second brake pad 20 are in contact with the rotor 14. Therefore, under a stronger braking state the total surface area of the brake pads contacting the rotor 14 is approximately equal to the total surface area of the conventional single piece brake pad mentioned above. It should be noted that the second piston brake line 38 is initially filled with enough hydraulic fluid 34 to force the second brake pad piston 24 against the second brake pad 20 while the braking system 10 is in a non-braking or light braking state. This ensures that the braking responsiveness is maintained once additional hydraulic fluid 34 enters the second piston brake line 38 as just described. It should be further noted that the sealing chamber 42 and the second piston brake line 38 are fluidly connected in this braking state.

Referring to FIG. 3, when the brakes are released the pressure forcing the hydraulic fluid 34 into the sealing chamber is also released. The sealing spring 28 biases the sealing piston 26 in the direction indicated by the first arrow 44 until the sealing piston 26 contacts the first stopper ring 48. Thus, the sealing chamber 42 and the second brake line 38 are no longer fluidly connected. The movement of the sealing piston 26 forces the hydraulic fluid 34 out of the sealing chamber 42 and back into the main brake line 40. Hydraulic fluid 34, however, remains in the second brake line 38 and the brake system 10 returns to the state shown in FIG. 3.

Figure 5A:
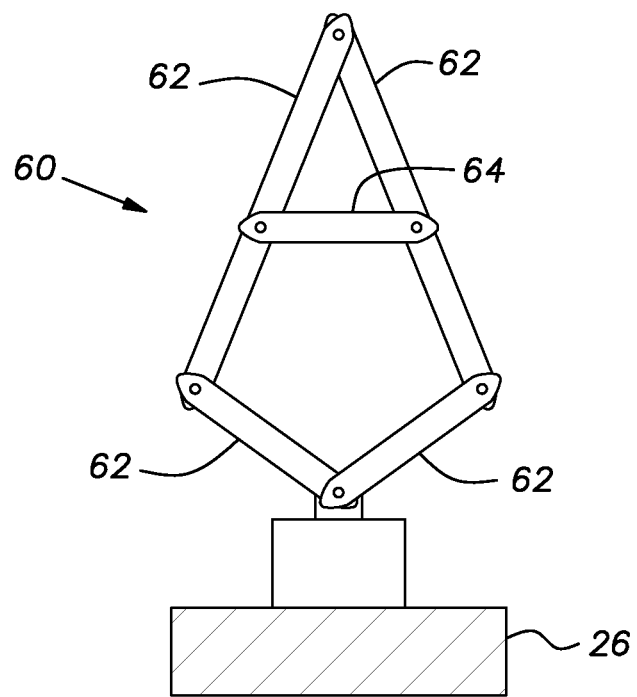
FIGS. 5A and 5B show an alternative embodiment of a sealing mechanism.
Figure 5B:
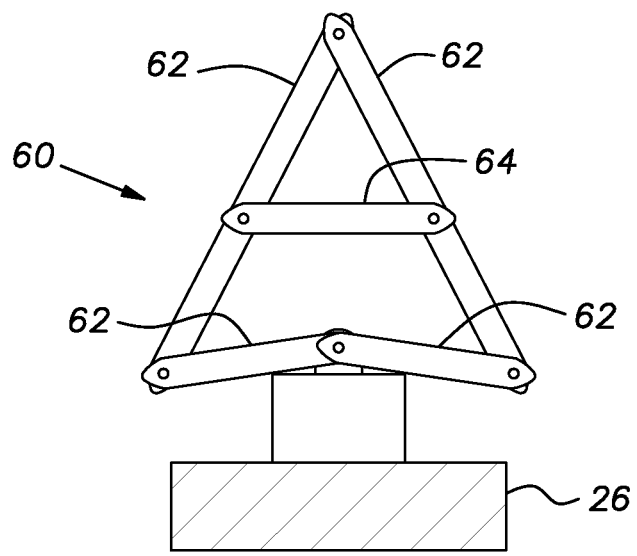

In an alternative embodiment the sealing mechanism comprises a sealing piston and a bi-stable mechanism. The bi-stable mechanism would toggle between an "open" and "closed" position based on the pressure applied by the driver to the brakes. One example of a bi-stable mechanism is shown in FIGS. 5A and 5B. The bi-stable mechanism 60 includes four bars 62 linked together with a flexible bracing member 64. FIG. 5A shows the bi-stable mechanism 60 in a closed position whereby the second brake line 38 is sealed off and additional hydraulic fluid 34 cannot enter the second brake line 38, as explained above. FIG. 5B shows the bi-stable mechanism 60 in an open position such as when the braking system 10 is in the stronger braking state and additional hydraulic fluid 34 is permitted to flow into the second brake line 38, as explained above.

In yet another alternative embodiment, not shown, the sealing mechanism comprises an electronic solenoid. The electronic solenoid would toggle between an "open" and "closed" position based on the pressure applied by the driver to the brakes or other braking measurement.

As explained above and illustrated in the drawings, the multi-pad braking system 10 reduces the brake drag, which in turn increases the fuel economy of the vehicle. Further, because at least one pad remains in constant contact with the disc with the same force as in the conventional single-piece brake pad braking responsiveness and performance are not compromised.

While specific embodiments of the invention have been described and illustrated, it is to be understood that these embodiments are provided by way of example only and that the invention is not to be construed as being limited but only by proper scope of the following claims.

What is claimed is:

1. A brake system for a disc brake having a rotor and a caliper for an automotive vehicle comprising:
    a plurality of brake pads located in the caliper and situated on one side of the rotor;
    a plurality of hydraulically actuated pistons to actuate the plurality of brake pads;
    a sealing mechanism situated in a hydraulic sealing chamber in direct fluid communication with a main brake line of the brake system, the sealing mechanism operating to regulate hydraulic pressure supplied by the brake system to the caliper;
    wherein the plurality of brake pads are configured to be in a first braking state, a second braking state and a third braking state via the supply of hydraulic pressure to the caliper, the plurality of brake pads selectively in one of the first state, the second state or the third state based on an amount of hydraulic pressure supplied to the caliper and applied by a user,
    wherein in the first state hydraulic pressure is supplied to the caliper and no hydraulic pressure is applied by the user, at least one brake pad from the plurality of brake pads is in contact with the rotor, the hydraulic pressure supplied to the caliper maintains contact of the at least one brake pad with the rotor, the forces that maintain contact of the at least one brake pad with the rotor are generated solely via the supply of hydraulic pressure, and at least one different brake pad from the plurality of brake pads is offset from the rotor, the at least one brake pad always remaining in at least the first state while the vehicle is in motion, and, wherein in the second state where hydraulic pressure is supplied to the caliper and a first amount of hydraulic pressure is applied by the user to the plurality of brake pads, the at least one brake pad is in contact with the rotor and applying a first braking force to the rotor, the hydraulic pressure supplied to the caliper maintains contact of the at least one brake pad with the rotor, and the at least one different brake pad is offset from the rotor, and wherein in the third state where hydraulic pressure is supplied to the caliper and a second amount of hydraulic pressure is applied by the user to the plurality of brake pads, the at least one brake pad and the at least one different brake pad are both in contact with the rotor and applying a second braking force to the rotor, and the hydraulic pressure supplied to the caliper maintains contact of the at least one brake pad and the at least one different brake pad with the rotor.

2. The brake system of claim 1 further comprising:
    a plurality of piston chambers; and
    a plurality of piston brake lines filled with hydraulic fluid and operatively connecting the hydraulic sealing chamber to the plurality of piston chambers,
    wherein the plurality of pistons reside inside the piston chambers, and
    wherein the sealing mechanism operates to regulate the flow of hydraulic fluid into the plurality of piston brake lines.

3. The brake system of claim 2, wherein in the first state the sealing mechanism is situated in the hydraulic sealing chamber such that the hydraulic sealing chamber is fluidly connected to at least one piston brake line from the plurality of piston brake lines and is not fluidly connected to at least one different piston brake line from the plurality of piston brake lines.

4. The brake system of claim 3, wherein in the second state additional hydraulic fluid flows from a main brake line into the hydraulic sealing chamber thereby increasing the pressure against the sealing mechanism, wherein the sealing mechanism operates to prevent hydraulic fluid from entering the at least one different piston brake line, and wherein the additional hydraulic fluid is forced into the at least one piston brake line thereby increasing the pressure of the at least one brake pad against the rotor to slow or stop the vehicle.

5. The brake system of claim 4, wherein in the third state a larger amount of hydraulic fluid enters the hydraulic sealing chamber thereby increasing the pressure against the sealing mechanism and moving the sealing mechanism such that the hydraulic fluid enters the at least one different piston brake line thereby forcing the at least one different brake pad against the rotor, and wherein the at least one brake pad and the at least one different brake pad act against the rotor to slow or stop the vehicle.

6. The brake system of claim 5, wherein the sealing mechanism includes a sealing piston and a sealing piston spring operatively connected to the sealing piston.

7. The brake system of claim 5, wherein the sealing mechanism includes a sealing piston and a bi-stable mechanism operatively connected to the sealing piston, wherein in a closed position the at least one different piston brake line is not fluidly connected to the sealing chamber, and wherein in an open position the at least one different piston brake line is fluidly connected to the sealing chamber.

8. A disc brake for an automotive vehicle comprising:
    a rotor;
    a single caliper;
    a first brake pad located in the single caliper and situated on one side of the rotor; and
    a second brake pad located in the single caliper and situated on the same side of the rotor, the first and second brake pads actuated via a supply of hydraulic pressure from a main brake line of the brake system to the caliper that is regulated by a sealing mechanism, a sealing mechanism being housed in a sealing chamber in direct fluid communication with the main brake line;
    the first and second brake pads selectively in one of a first braking state, a second braking state and a third braking state and movable to the others of the first state, the second state and the third state via the supply of hydraulic pressure to the caliper, wherein in the first state where hydraulic pressure is supplied to the caliper and no hydraulic pressure is applied by the user, the first brake pad is in contact with the rotor and applies a first braking force to the rotor, the hydraulic pressure supplied to the caliper maintains contact of the first brake pad with the rotor, the forces that maintain contact of the first brake pad with the rotor are generated solely via the supply of hydraulic pressure, and the second brake pad is spaced from the rotor, and wherein in the second state where hydraulic pressure is supplied to the caliper and a first amount of hydraulic pressure is applied by the user, the first brake pad is in contact with the rotor and applies a second braking force to the rotor that is higher than the first braking force, the hydraulic pressure supplied to the caliper maintains contact of the first brake pad with the rotor, and the second brake pad is spaced from the rotor, and wherein in the third state where hydraulic pressure is supplied to the caliper and a second amount of hydraulic pressure is applied by the user, the first and second brake pads are in contact with the rotor, the hydraulic pressure supplied to the caliper maintains contact of the first and second brake pads with the rotor, and wherein the first brake pad always remains in contact with the rotor via the supply of hydraulic pressure to the caliper while the vehicle is in motion.

9. The disc brake of claim 8 further comprising:
a first piston housed in a first piston chamber whereby the first piston actuates the first brake pad;
a second piston housed in a second piston chamber whereby the second piston actuates the second brake pad;
a first piston brake line operatively connecting the first piston chamber to the sealing chamber; and
a second piston brake line operatively connecting the second piston chamber to the sealing chamber,
wherein the sealing mechanism operates to regulate the flow of hydraulic fluid into the first and second piston brake lines.

10. The disc brake of claim 9, wherein in the first state the sealing mechanism is situated in the sealing chamber such that the hydraulic sealing chamber is fluidly connected to the first piston brake line and is not fluidly connected to the second piston brake line.

11. The disc brake of claim 10, wherein in the second state additional hydraulic fluid flows from a main brake line into the hydraulic sealing chamber thereby increasing the pressure against the sealing mechanism, wherein the sealing mechanism operates to prevent hydraulic fluid from entering the second piston brake line, and wherein the additional hydraulic fluid is forced into the first piston brake line thereby increasing the pressure of the first brake pad against the rotor to slow or stop the vehicle.

12. The disc brake of claim 11, wherein in the third state a larger amount of hydraulic fluid enters the hydraulic sealing chamber thereby increasing the pressure against the sealing mechanism and moving the sealing mechanism such that the hydraulic fluid enters the second piston brake line thereby forcing the second brake pad against the rotor, and wherein the first brake pad and the second brake pad act against the rotor to slow or stop the vehicle.

13. The disc brake of claim 12, wherein the sealing mechanism includes a sealing piston and a sealing piston spring operatively connected to the sealing piston.

14. The disc brake of claim 12, wherein the sealing mechanism includes a sealing piston and a bi-stable mechanism operatively connected to the sealing piston, wherein in a closed position the second brake line is not fluidly connected to the sealing chamber and wherein in an open position the first piston brake line is fluidly connected to the sealing chamber.

15. A method of operating a braking system for an automotive vehicle comprising the steps of:
providing a disc brake having a rotor, a single caliper, a first hydraulically actuated brake pad and a second hydraulically actuated brake pad both located in the single caliper and situated on one side of the rotor, the first and second brake pads actuated via a supply of hydraulic pressure to the caliper that is regulated by a sealing mechanism housed in a sealing chamber in direct fluid communication with a main brake line of the braking system;
supplying hydraulic fluid to the caliper to apply and maintain the first and second brake pads against the rotor, applying and maintaining the first brake pad against the rotor at a first braking force and maintaining the second brake pad spaced from the rotor when hydraulic pressure is supplied to the caliper and a braking force request from a user is absent, the forces that maintain contact of the first brake pad with the rotor being generated solely via the supply of hydraulic pressure, the first brake pad always applies at least the first braking force during movement of the vehicle;
applying and maintaining the first brake pad against the rotor at a second braking force and maintaining the second brake pad spaced from the rotor when hydraulic pressure is supplied to the caliper and the braking force request is below a predetermined threshold, the second braking force higher than the first braking force and corresponding to the amount of the braking force request from the user; and
applying and maintaining the first and second brake pads against the rotor when hydraulic pressure is supplied to the caliper and the braking force request equals or exceeds the predetermined threshold.

16. The method of claim 15 wherein maintaining the second brake pad spaced apart from the rotor includes blocking hydraulic fluid from moving the second brake pad into the rotor.

* * * * *